(12) United States Patent
Sautto et al.

(10) Patent No.: US 12,526,011 B2
(45) Date of Patent: Jan. 13, 2026

(54) RUNTIME ANTENNA MATCHING FOR NEAR FIELD COMMUNICATION WIRELESS POWER TRANSFER

(71) Applicant: RENESAS ELECTRONICS AMERICA INC., Milpitas, CA (US)

(72) Inventors: Marco Sautto, Zurich (CH); Filippo Maria Neri, Zurich (CH); Gustavo James Mehas, Fall City, WA (US)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 59 days.

(21) Appl. No.: 18/539,712

(22) Filed: Dec. 14, 2023

(65) Prior Publication Data
US 2025/0202533 A1 Jun. 19, 2025

(51) Int. Cl.
*H04B 5/79* (2024.01)
*H02J 50/12* (2016.01)

(52) U.S. Cl.
CPC .............. *H04B 5/79* (2024.01); *H02J 50/12* (2016.02)

(58) Field of Classification Search
CPC .................................. H02J 50/00; H04B 5/00
See application file for complete search history.

(56) References Cited

U.S. PATENT DOCUMENTS

| | | | |
|---|---|---|---|
| 2016/0336757 A1* | 11/2016 | Kasturi | H02J 50/12 |
| 2016/0359320 A1* | 12/2016 | Bisogno | H02M 1/32 |
| 2017/0093217 A1* | 3/2017 | Cho | H02J 50/12 |
| 2017/0271924 A1* | 9/2017 | Mao | H03M 1/1245 |
| 2022/0337149 A1* | 10/2022 | Ionescu | H02M 3/07 |
| 2023/0129480 A1* | 4/2023 | Hong | H02J 7/04 |
| | | | 307/104 |
| 2025/0053218 A1* | 2/2025 | Joos | G06F 1/305 |

* cited by examiner

*Primary Examiner* — Adi Amrany
(74) *Attorney, Agent, or Firm* — SCULLY, SCOTT, MURPHY & PRESSER, P.C.

(57) ABSTRACT

Systems and methods for runtime antenna matching for wireless power devices are described. The integrated circuit can include a controller. The integrated circuit can further include a circuit configured to sense voltage in a switching converter. The circuit can be further configured to determine whether a negative voltage spike is present or absent in the sensed voltage. The controller can be configured to, based on the presence or the absence of the negative voltage spike in the sensed voltage, tune a capacitance of an antenna interface circuit between the switching converter and an antenna to perform impedance matching.

18 Claims, 9 Drawing Sheets

RUNTIME ANTENNA MATCHING FOR NEAR FIELD COMMUNICATION WIRELESS POWER TRANSFER

BACKGROUND

The present disclosure relates in general to apparatuses and methods for antenna matching in wireless power devices. Particularly, run-time antenna matching that can be performed by near field communication (NFC) wireless charging devices are described.

Wireless power transfer using near field communication (NFC) protocol (e.g., NFC wireless power systems) can occur between two devices that include near field communication (NFC) interfaces. Such NFC wireless power systems can include a poller having a transmission coil and a listener having a receiver coil. In an aspect, the poller may be connected to a structure including a wireless charging region. In response to a device including the listener being placed near a device including the poller, the transmission coil and the receiver coil can be inductively coupled with one another to establish an NFC communication link between the poller and the listener and inductive transfer of alternating current (AC) power can occur using the established NFC communication link. The transfer of AC power, from the poller to the listener, can facilitate charging of a battery of the device including the listener.

SUMMARY

In one embodiment, an integrated circuit for runtime antenna matching for wireless power devices is generally described. The integrated circuit can include a controller. The integrated circuit can further include a circuit configured to sense voltage in a switching converter. The circuit can be further configured to determine whether a negative voltage spike is present or absent in the sensed voltage. The controller can be configured to, based on the presence or the absence of the negative voltage spike in the sensed voltage, tune a capacitance of an antenna interface circuit between the switching converter and an antenna to perform impedance matching.

In one embodiment, a device for runtime antenna matching for wireless power devices is generally described. The device can include an antenna. The device can further include an antenna interface circuit. The device can further include a transmitter configured to sense voltage in a switching converter of the transmitter. The transmitter can be further configured to determine whether a negative voltage spike is present or absent in the sensed voltage. The transmitter can further be configured to, based on the presence or the absence of the negative voltage spike in the sensed voltage, tune a capacitance of the antenna interface circuit between the switching converter and the antenna to perform impedance matching.

In one embodiment, a method for operating a wireless power device for runtime antenna matching is generally described. The method can include sensing voltage in a switching converter. The method can further include determining whether a negative voltage spike is present or absent in the sensed voltage. The method can further include, based on the presence or the absence of the negative voltage spike in the sensed voltage, tuning a capacitance of an antenna interface circuit between the switching converter and an antenna to perform impedance matching.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

NFC wireless power systems can provide charging under a static mode or a negotiated mode. Static mode can use standard radio frequency (RF) field strength and provides a consistent power level and negotiated mode can use a relatively higher RF field supporting different power transfer classes, such as 250, 500, 750 and 1000 milliwatts (mW). In NFC wireless power systems, the poller and listener can communicate with each other using NFC communication protocols. In an aspect, NFC wireless power systems can use a specific base frequency (e.g., 13.56 Megahertz (MHz)) and leverages the NFC communication link between the two devices to control the power transfer. To perform NFC communication, one device can apply or transfer a modulation signal, for example, amplitude-shift keying (ASK) signal, to the other device, and the other device can demodulate the modulation signal.

Figure 1:
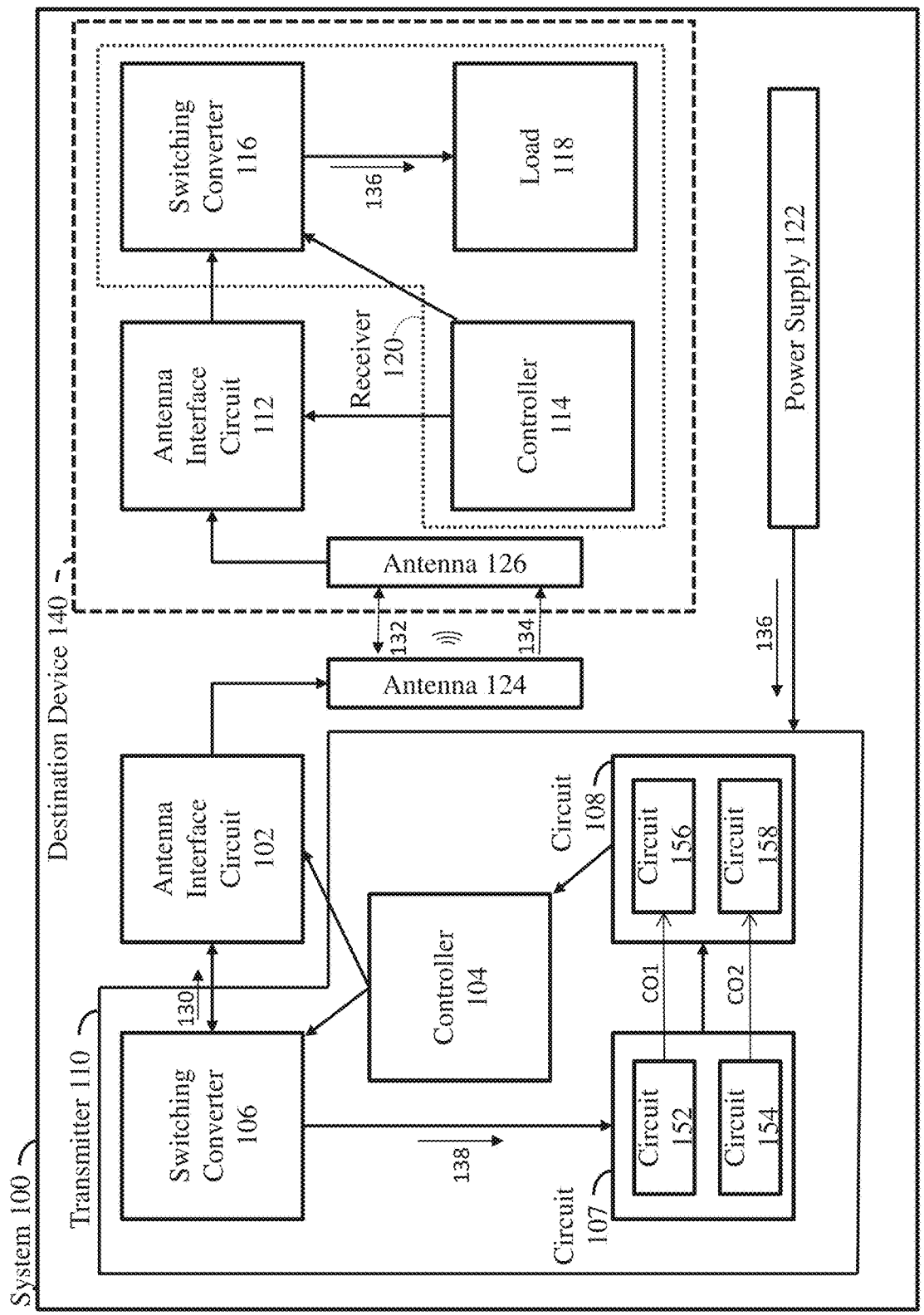
FIG. 1 is a diagram showing an example system that can implement run time antenna matching for near field communication wireless power transfer in one embodiment.

FIG. 1 is a diagram showing an example system that can implement current mode demodulation in NFC in one embodiment. System 100 can include an antenna interface circuit 102 and power devices, such as a transmitter 110 and a receiver 120, that are configured to wirelessly transfer power and data therebetween via inductive coupling. While described herein as transmitter 110 and receiver 120, each of transmitter 110 and receiver 120 may be configured to both transmit and receive power or data therebetween via inductive coupling. Transmitter 110 can be referred to as a wireless power transmitter and receiver 120 can be referred to as a wireless power receiver. In an embodiment where system 100 is configured as an NFC wireless power system, transmitter 110 can be configured as a poller and receiver 120 can be configured as a listener.

Transmitter 110 can be configured to receive power from one or more power supplies and to transmit AC power to receiver 120 wirelessly. For example, transmitter 110 can be configured for connection to a power supply 122 such as, e.g., an adapter or a direct current (DC) power supply. Transmitter 110 can be a semiconductor device including a controller 104, a switching converter 106, a circuit 107, and a circuit 108. Transmitter 110 can be connected to an antenna 124. Switching converter 106 can be an integrated circuit (IC), that can be a part of a power driver, configured to convert one type of electric current into another type of electric current. By way of example, switching converter 106 can be configured as an inverter to convert a DC signal into an AC signal. To be described in more detail below, circuit 107 can be configured to sense voltage signals in switching converter 106 and transmit the voltage signals to circuit 108. Circuit 108 can be configured to detect negative voltage spikes at two low-side metal-oxide-semiconductor field-effect transistors (MOSFETs) labeled as LS1, LS2. In one embodiment, circuit 107 and circuit 108 can be mounted on the same circuit board and implemented as one circuit.

Controller 104 can be configured to control and operate switching converter 106, circuit 107, and other components of transmitter 110. Controller 104 can include, for example, a processor, central processing unit (CPU), field-programmable gate array (FPGA) or any other circuitry that is configured to control and operate switching converter 106. While described as a CPU in illustrative embodiments, controller 104 is not limited to a CPU in these embodiments and may comprise any other circuitry that is configured to control and operate switching converter 106. In an example embodiment, controller 104 can be configured to control switching converter 106 by using a drive signal to switch devices, such as transistors, in switching converter 106. The device switching in switching converter 106 can drive antenna 124 at a range of frequencies and configurations defined by wireless power standards, such as, e.g., the NFC Forum's wireless charging (WLC) specifications. Antenna 124 can include a resonant circuit that includes one or more capacitors, inductors, resistors, that can form circuitry for outputting communication signals 132 and conveying AC power 134 to the receiver 120. Antenna interface circuit 102 can be connected to the transmitter 110 and include one or more capacitors, inductors, resistors that form filters, matching network, or other circuitry for interfacing transmitter 110 with antenna 124.

Receiver 120 can be configured to receive AC power 134 transmitted from transmitter 110 and to supply the power to one or more loads 118 or other components of a destination device that includes receiver 120. Load 118 may comprise, for example, a battery charger that is configured to charge a battery of a destination device 140, a DC-DC converter that is configured to supply DC power 136 to a processor, a display, or other electronic components of the destination device 140, or any other load of the destination device 140.

A destination device can include an antenna interface circuit 112 and receiver 120. Destination device 140 can be, for example, a computing device, smart device, wearable device or any other electronic device that is configured to receive power wirelessly. In other embodiments, receiver 120 may be separated from a destination device and connected to the destination device via a wire or other component that is configured to provide power to destination device 140.

Receiver 120 can be a semiconductor device including a controller 114 and a switching converter 116. Receiver 120 can be connected to an antenna 126. Controller 114 can be an integrated circuit including, for example, a digital controller such as a microcontroller, a processor, CPU, FPGA or any other circuitry that may be configured to control and operate switching converter 116. Antenna 126 can be connected to an antenna interface circuit 112 that includes one or more capacitors, inductors, resistors, that can form circuitry for outputting communication signals 132 and conveying AC power 134, received from transmitter 110 by antenna 126. Antenna interface circuit 112 can include one or more capacitors, inductors, resistors that form filters, matching network, or other circuitry for interfacing receiver 120 with antenna 126. Switching converter 116 can be an IC configured to convert one type of electric current into another type of electric current. By way of example, switching converter 116 can be configured as a power rectifier to convert an AC signal into a DC signal. Switching converter 116, when configured as a power rectifier, can include a rectifier circuit such as half-bridge rectifiers, full bridge rectifiers, or other types of rectifier circuits that can be configured to rectify power received via antenna 126 into a power type as needed for load 118. Controller 114 can be configured to execute application specific programs and/or firmware to control and operate various components, such as antenna interface circuit 112 and switching converter 116 of receiver 120.

As an example, when receiver 120 is placed in proximity to transmitter 110, the magnetic field produced by antenna 124 can induce a current in antenna 126. The induced current causes AC power 134 to be inductively transmitted to switching converter 116, via antenna 126. Switching converter 116 can receive AC power 134 and converts AC power 134 into DC power 136. DC power 136 is then provided to load 118.

Transmitter 110 and receiver 120 are also configured to exchange information or data, e.g., messages, via the inductive coupling of antenna 124 and antenna 126. For example, before transmitter 110 begins transferring power to receiver 120, a power contract may be agreed upon and created between receiver 120 and transmitter 110. For example, receiver 120 may send communication signals 132 or other data to transmitter 110 that indicate power transfer information such as, e.g., an amount of power to be transferred to receiver 120, commands to increase, decrease, or maintain a power level of AC power 134, commands to stop a power transfer, or other power transfer information. In another example, in response to receiver 120 being brought in proximity to transmitter 110, e.g., close enough such that a transformer may be formed by antenna 124 and antenna 126 to allow power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120, e.g., if the power contract is already in place. Transmitter 110 and receiver 120 may transmit and receive communication signals 132, data or other information via the inductive coupling of antenna 124 and antenna 126.

NFC is a short-range wireless communication technology enabling standardized communication between two devices such as smartphones or smart tags. Traditionally, NFC can be used for data exchange, and NFC can be extended to allow wireless power transfer from the poller to the listener at power levels in a range of approximately 1 watt (W) to 5 W. A key challenge in NFC systems is antenna design and impedance matching for optimal power transfer efficiency. This is especially the case in wireless power applications where the equivalent impedance seen by the receiver can vary widely.

To be described in more detail below, transmitter 110 of system 100 can perform a runtime antenna matching technique, with a reduced number of external components, to continuously optimize antenna impedance as operating conditions change. To perform runtime antenna matching without additional external components, circuit 107 in transmitter 110 can be configured to sense a voltage in switching converter 106 and transmit the voltage signals to circuit 108. Circuit 108 can be configured to detect negative voltage spikes. Controller 104 can be configured to use the detected voltage spikes to determine how to continuously match antenna impendence to the output impedance of transmitter 110.

Figure 2:
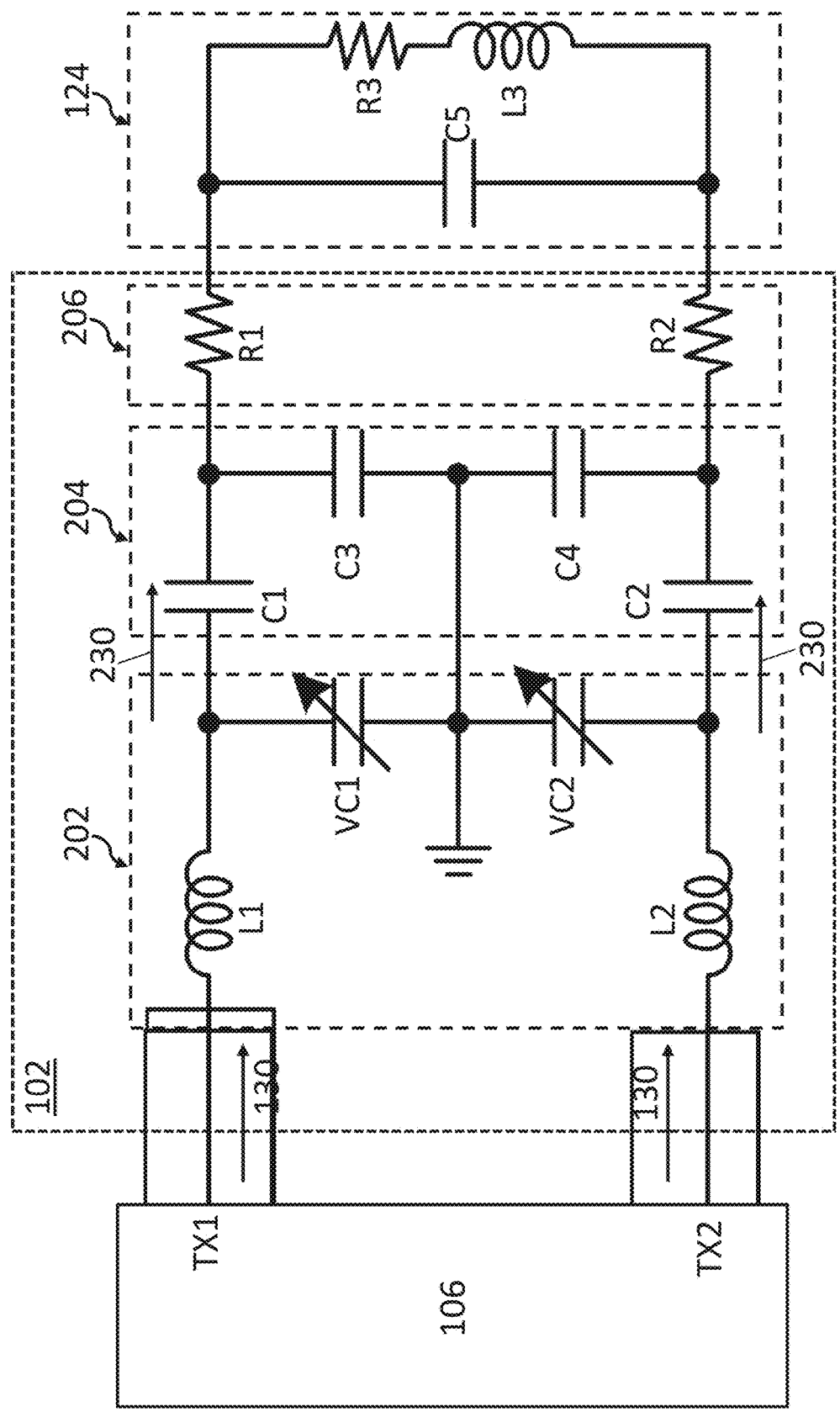
FIG. 2 is a diagram showing an example embodiment that can implement run time antenna matching for near field communication wireless power transfer in one embodiment.

FIG. 2 is a diagram showing an example circuit that can be implemented in a poller to execute run time antenna matching for near field communication wireless power transfer in one embodiment. Descriptions of FIG. 2 may reference components shown in FIG. 1. In an embodiment shown in FIG. 2, antenna interface circuit 102, shown in FIG. 1, can be formed by a plurality of circuit components, such as resistors, inductors, and capacitors that can be continuously tuned in order for an input impedance of the antenna 124 to match an output impedance of transmitter 110. Antenna interface circuit 102 can include an electromagnetic compatibility (EMC) filter 202, a matching network 204 and a damping circuit 206. Further, EMC filter 202 can comprise of two inductors L1 and L2, as well as two variable capacitors VC1 and VC2. Matching network 204 can comprise of four capacitors C1, C2, C3, and C4. Damping circuit 206 can comprise of two resistors R1 and R2. Equivalent antenna circuit can comprise of resistor R3, inductor L3, and capacitor C7. Antenna interface circuit 102 can be connected to two nodes TX1, TX2 of switching converter 106 in transmitter 110.

Switching converter 106 can send one or more drive signals 130 which can be square waves to EMC filter 202 of antenna interface circuit 102. EMC filter 202 can convert drive signals 130 into sinusoidal signals 230 to reduce electromagnetic interference (EMI). Due to an inherently high impedance within an antenna, such as antenna 124 or antenna 126, the impendence needs to be matched between the output of transmitter 110 and the input of antenna 124. The sinusoidal signals 230 output by EMC filter 202 can pass through the matching network 204 where the arrangement of capacitors C1, C2, C3, and C4 in matching network 204 can allow the impedance in the antenna 124 to match the output impedance of transmitter 110. In one embodiment, damping circuit 206 can include optional components configured to reduce the quality (Q) factor of the antenna 124. The resistors R1 and R2 among damping circuit 206 can increase the bandwidth of the system by lowering the Q factor of the antenna. Also shown in FIG. 2, antenna 124 can be modeled by at least a resistor R3, an inductor L3, and a capacitor C5. Antenna 124 can be configured to transmit the communication signals from the transmitter 110 to the receiver 120 by generating a magnetic field.

Referring to the embodiment shown in FIG. 1, circuit 107 can measure voltages (e.g., voltages across LS1 and LS2) in switching converter 106. Circuit 108 can detect whether voltage spikes, such as negative voltage spikes, are present or absent in the voltages measured by circuit 107. Controller 104 can tune one or more components in antenna interface circuit 102 based on the presence or absence of voltage spikes that can be indicated by an output of circuit 108. In one embodiment, controller 104 can tune variable capacitors VC1 and VC2 by changing the voltage of the variable capacitors VC1 and VC2. Tuning of the variable capacitors VC1 and VC2 can cause antenna 124 to be tuned to match the output impedance of transmitter 110. By tuning VC1 and VC2, the resonant frequency of antenna interface circuit 102 can be adjusted to correspond to the switching frequency of switching converter 106. The correspondence between the resonant frequency of antenna interface circuit 102 and the switching frequency of switching converter 106 can cause the loading impedance of transmitter 110 to be purely resistive, thus avoiding reactive power losses and the impedance of the antenna 124 can match the output impedance of transmitter 110.

Figure 3:
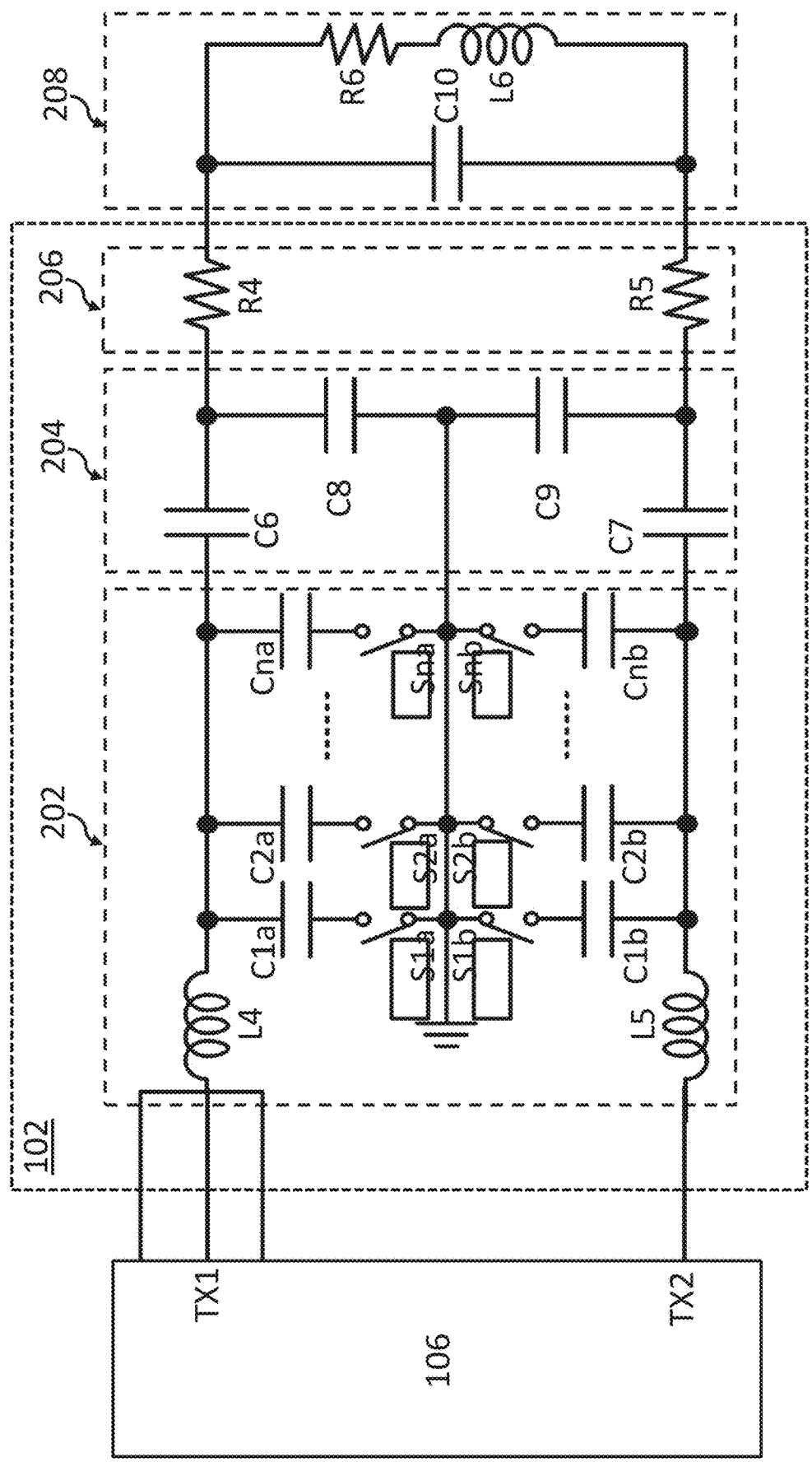
FIG. 3 is a diagram showing another example embodiment that can implement run time antenna matching for near field communication wireless power transfer in one embodiment.

FIG. 3 is a diagram showing another example circuit that can be implemented in a poller to execute run time antenna matching for near field communication wireless power transfer in one embodiment. In another example embodiment shown in FIG. 3, antenna interface circuit 102 can be configured to have capacitors and switches in series in EMC filter 202 . . . . C1a, C2a, . . . . Cna, and C1b, C2b, . . . . Cnb. As an alternative to using variable capacitors VC1 and VC2 as seen in FIG. 2 to tune the antenna 124, capacitors C1a, C2a, . . . . Cna, and C1b, C2b, . . . . Cnb can switched into or out of EMC filter 202 to tune antenna 124. Each capacitor in EMC filter 202 can be connected to a switch in series, and each connected switch can be controlled by controller 104 to switch a connected capacitor into or out of EMC filter 202. Some of the capacitors in EMC filter 202 can be connected in series with one another and some of the capacitors in EMC filter 202 can be connected parallel to one another. The series and parallel connections, along with having a respective switch for each capacitor, can allow controller 104 to tune antenna 124 by different degrees. The controller 104 can control the switches to enable or disable the corresponding capacitor to change an impedance of antenna 124. By way of example, switching two capacitors connected in series into or out of EMC filter 202 can impact the impedance of antenna 124 less when compared to switching two capacitors connected in parallel. By selectively switching the capacitors in EMC filter 202, the resonant frequency of antenna interface circuit 102 can be adjusted to correspond to the switching frequency of switching converter 106. The correspondence between the resonant frequency of antenna interface circuit 102 and the switching frequency of switching converter 106 can cause the loading impedance of transmitter 110 to be purely resistive, thus avoiding reactive power losses and the impedance of the antenna 124 can match the output impedance of transmitter 110.

Figure 4:
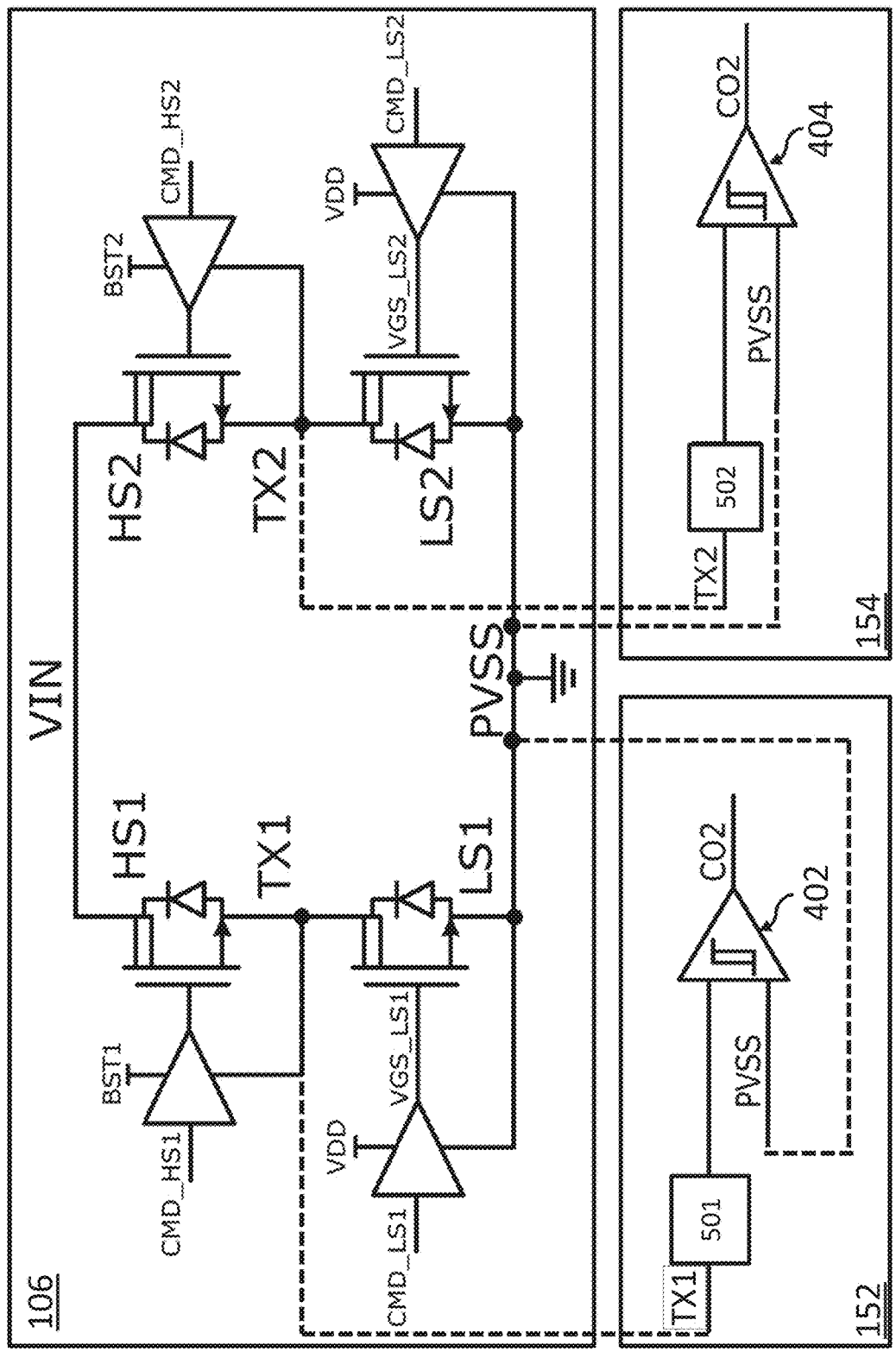
FIG. 4 is a diagram showing one or more circuits that can implement run time antenna matching for near field communication wireless power transfer in one embodiment.

FIG. 4 is a diagram showing one or more circuits that can be implemented for run time antenna matching for near field communication wireless power transfer in one embodiment. In an embodiment shown in FIG. 4, switching converter 106 can be an inverter configured to drive antenna 124. Switching converter 106 can be formed by two half-bridge circuits including two high-side metal-oxide-semiconductor field-effect transistors (MOSFETs) HS1, HS2 and two low-side MOSFETs LS1, LS2. The two nodes TX1 and TX2 are driven by the switches HS1, HS2, LS1, LS2 of switching converter 106 and can generate two square waves at 50% duty cycle with relative 180 degrees phase shift. Circuit 107 can include circuit 152 and circuit 154. Circuit 152 can be configured to sense the voltage on LS1 by measuring the voltage between the TX1 node and power supply ground (PVSS). Circuit 154 can be configured to sense the voltage on LS2 by measuring the voltage between the TX2 node and PVSS.

By way of example, circuit 152 comprises of a clamp circuit 501 that can be connected between the TX1 node and a comparator 402. Clamp circuit 501 can be a MOSFET or a circuit configured to limit the output voltage to shield any high voltage at TX1. Comparator 402 can be configured to generate a voltage signal CO1. Circuit 154 comprises of a clamp circuit 502 that can be connected between the TX2 node and a comparator 404. Clamp circuit 502 can be a MOSFET or a circuit configured to limit the output voltage to shield any high voltage at TX2. Comparator 404 can be configured to generate a voltage signal CO2.

In one embodiment, switching converter 106 can operate in a tristate mode where switches HS1, HS2, LS1, LS2 are turned off. When switches HS1, HS2, LS1, and LS2 are turned off, their body diodes can still have the ability to conduct. Therefore, circuits 152, 154 can still sense low voltage signals (e.g., zero, close to zero or a relatively low voltage representing logic low). The sensed low voltage signals can be provided to comparators 402, 404 in circuits 152, 154, respectively. Comparator 402 can output voltage signal CO1 and comparator 404 can output voltage signal CO2. In one embodiment, circuit 108 can be configured to use voltage signals CO1, CO2 to detect negative spikes at the end of a switching cycle within the voltages measured from nodes TX1 and TX2. In one embodiment, if there are glitches or negative voltage spikes at the end of a switching cycle in the voltages measured from LS1, LS2, then voltage signals CO1, CO2 can be high voltage signals (e.g., '1' or a relatively high voltage representing logic high. In one embodiment, circuit 108 can be configured to use voltage signals CO1, CO2 to detect negative spikes at the beginning of a switching cycle within the voltages measured from nodes TX1 and TX2. In another embodiment, circuit 108 can be configured to use voltage signals CO1, CO2 to detect positive spikes within the voltages measured from measured from HS1 and HS2 at the end of a switching cycle.

Figure 5:
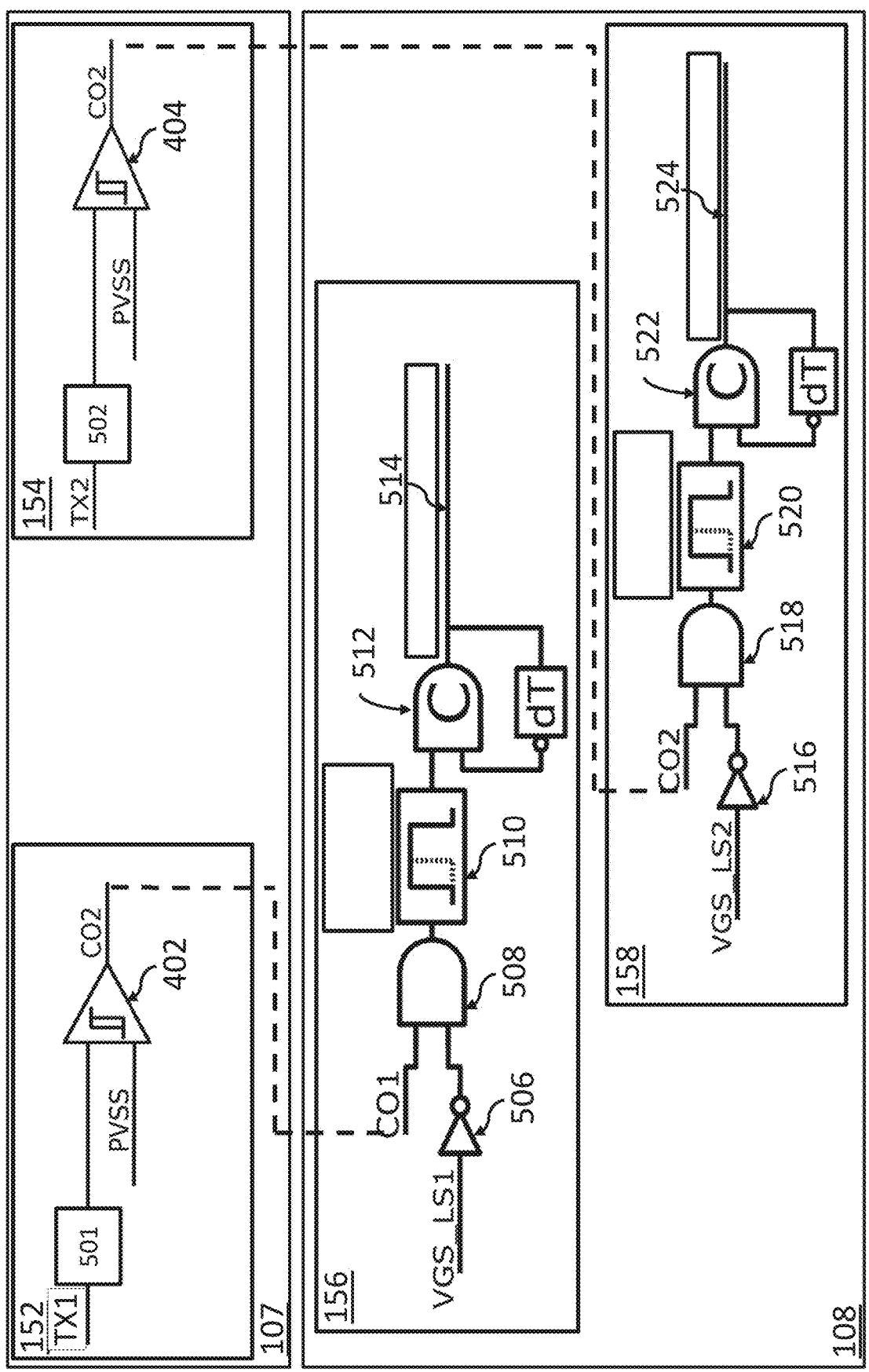
FIG. 5 is a diagram showing one or more circuits that can implement run time antenna matching for near field communication wireless power transfer in one embodiment.

FIG. 5 is a diagram showing one or more circuits that can be implemented for run time antenna matching for near field communication wireless power transfer in one embodiment. In an embodiment shown in FIG. 5, circuits 152 and circuit 154 are in connection with circuits 156 and 158 in circuit 108, respectively. Circuit 156 comprises of an inverter 506, an AND gate 508, a rising edge filter 510 and a C-element 512. Circuit 155 can receive voltage signal CO1 from circuit 107. Circuit 155 can also receive the gate source voltage of LS1, labeled as VGS_LS1, from the switching converter 106. Inverter 506 can invert VGS_LS1, where the inverted VGS_LS1 and voltage signal CO1 can be provided as inputs to the AND gate 508. When LS1 is turned off, VGS_LS1 can gradually drop to zero and inverter 506 can output a voltage representing logic high (or '1'), which causes AND gate 508 to pass CO1 to rising edge filter 510, regardless of the state or value of CO1. Rising edge filter 510 can be a circuit configured to filter the voltage signal CO1 to reduce any high frequency bouncing caused by the comparator 402. C-element 512 can be a logic circuit that retains its current state unless both inputs are the same. If CO1 remains at high voltage for a predefined amount of time dT, C-element 512 can latch a high voltage at its output 514 for dT. The output 514 of C-element 512 remaining high for dT can indicate that the voltage at node TX1 has a glitch, i.e., a negative voltage spike.

Circuit 158 comprises of an inverter 516, an AND gate 518, a rising edge filter 520 and a C-element 522. Circuit 158 can receive voltage signal CO2 from circuit 107. Circuit 158 can also receive the gate source voltage of LS2, labeled as VGS_LS2, from the switching converter 106. Inverter 516 can invert VGS_LS2, where the inverted VGS_LS2 and voltage signal CO2 can be provided as inputs to the AND gate 518. When LS2 is turned off, VGS_LS2 can gradually drop to zero and inverter 516 can output a voltage representing logic high (or '1'), which causes AND gate 518 to pass CO2 to rising edge filter 520, regardless of the state or value of CO2. Rising edge filter 520 can be a circuit configured to filter the voltage signal CO2 to reduce any high frequency bouncing caused by the comparator 404. C-element 522 can be a logic circuit that retains its current state unless both inputs are the same. If CO2 remains at high voltage for a predefined amount of time dT, C-element 522 can latch a high voltage at its output 524 for dT. The output 524 of C-element 522 remaining high for dT can indicate that the voltage at node TX2 has a glitch, i.e., a negative voltage spike.

Figure 6:
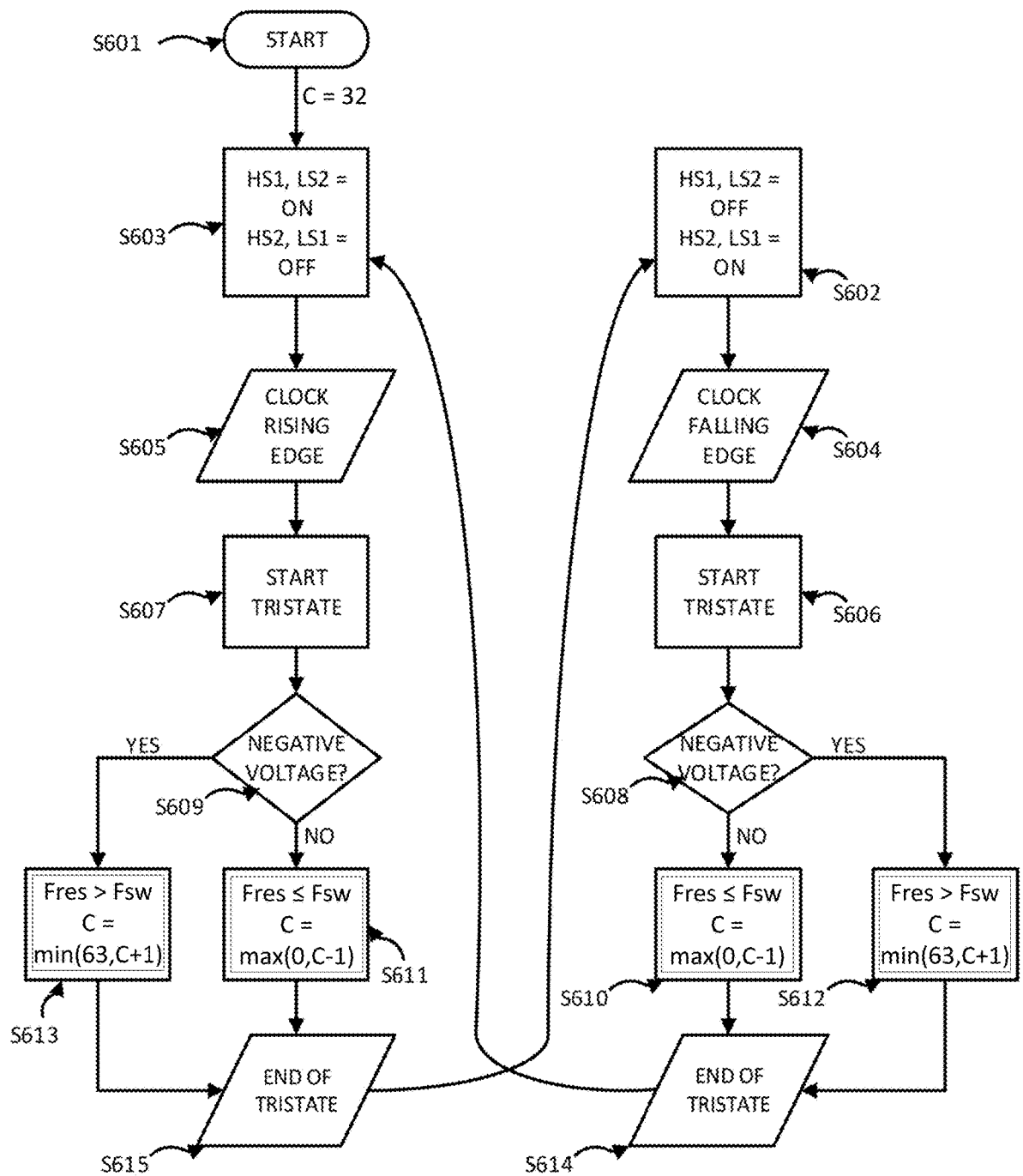
FIG. 6 is a diagram showing a process to update a count that can be used in run time antenna matching for near field communication wireless power transfer in one embodiment.

FIG. 6 is a flowchart diagram showing a process to update a count that can be used in runtime antenna matching for near field communication wireless power transfer in one embodiment. A process 600 shown in FIG. 6 can include one or more operations, actions, or functions as illustrated by one or more of blocks S601, S602, S603, S604, S605, S606, S607, S608, S609, S610, S611, S612, S613, S614 and/or S615. Although illustrated as discrete blocks, various blocks can be divided into additional blocks, combined into fewer blocks, eliminated, performed in different order, or performed in parallel, depending on the desired implementation. Descriptions of FIG. 6 can reference components that are shown in FIG. 1 to FIG. 5.

In an aspect, to achieve precise matching between the output impedance of transmitter 110 and antenna 124, input impedance of matching network 204 needs to be purely resistive. To cause the input impedance of matching network 204 to be purely resistive, the voltage at node TX1, TX2 needs to be in phase with the current flowing through TX1, TX2. When the voltage and current at nodes TX1, TX2 are in phase, the zero-current event is also in phase with the zero-voltage event. In an aspect, the voltages at nodes TX1, TX2 are known since the voltages are being provided by transmitter 110. In order to measure the current at nodes TX1, TX2, controller 104 can perform process 600 shown in FIG. 6 to insert a tristate mode of switching converter 106 at a time that is close to the zero-voltage event. During the tristate mode, controller 104 can detect a presence or an absence of negative voltage spikes in the voltages at nodes TX1, TX2. The presence or absence of negative voltage spikes can indicate directions (e.g., positive or negative) of current flowing through nodes TX1, TX2. The directions of the current can indicate the relative phase between voltage and current and can be used for determining how to adjust VC1, VC2 in FIG. 2 (or which switches to activate in FIG. 3).

Process 600 begins with block S601 by having controller 104 initialize a count C set to an initial value, such as C=32. The count C can represent a number of consecutive negative voltage spike presence or absence that is counted by controller 104. A maximum of count C can be programmable, and a minimum of count C can be set to zero. In one embodiment, the initial value of C can be a median (e.g., rounded to nearest integer) between the maximum and minimum of C. By way of example, if the maximum of C is 63 and the minimum is zero then the initial value of C can be set to 32 in block S601.

At block S603, controller 104 can drive switching converter 106 as an inverter by switching the pair HS1, LS2 and the pair HS2, LS1, alternately. In block S603, HS1 and LS2 are turned on while HS2 and LS1 are turned off. At block S605, a clock of controller 104 can transition from a low state to a high state, i.e., rising edge event occurs. In response to the rising edge event, process 600 can proceed to block S607 where controller 104 can start a tristate mode by turning off HS1, HS2, LS1 and LS2. In an aspect, since HS1 and LS2 were turned on in block S603, when controller 104 turns off HS1 and LS2 for tristate mode, the voltage at LS2 may need some time to drop to zero. The insertion of tristate mode in response to the rising edge event can allow sufficient voltage to be fed into comparator 404 of circuit 154 for measuring voltage across LS2, from nodes TX2 and PVSS. Therefore, at block S607, controller 104 inserts the tristate mode close to a zero-voltage event (e.g., before voltage at LS2 becomes zero).

During the tristate time or tristate mode, controller 104 can perform blocks S609, S611, S613 and S615. In block S609, controller 104 can use circuits 107, 108 to detect a presence or an absence of voltage spikes in the voltages measured from nodes TX1 and TX2. In response to controller 104 detecting an absence of voltage spikes in block S609, process 600 can proceed to block S611 to update a value of the count C. The absence of negative voltage spike in block S609 can indicate a need to increase the resonant frequency Fres. In response to controller 104 detecting a presence of voltage spikes in block S609, process 600 can proceed to block S613 to update the value of the count C. The presence of negative voltage spike in block S609 can indicate a need to decrease the resonant frequency Fres. At block S611, the absence of voltage spikes can indicate that a resonant frequency ("Fres") is less than or equal to a switching frequency ("Fsw") of switching converter 106. Thus, controller 104 can determine that Fres≤Fsw in block S611. Further, at block S611, the count C can be set to a larger value between zero and C−1. By way of example, if C=32, then at block S613 the count C will be set to 31 because 32−1 is larger than zero. Hence, the count C will not be less than zero. At block S615, the tristate time can lapse and controller 104 can return to switching HS1, HS2, LS1, LS2 to operate switching converter 106 by proceeding to block S602.

At block S613, the presence of voltage spikes can indicate that resonant frequency Fres is greater than or equal to switching frequency Fsw of switching converter 106. Thus, controller 104 can determine that Fres>Fsw in block S613. Further, at block S613, the count C can be set to a smaller value between the maximum C, such as 63, and C+1. By way of example, if C=32, then at block S611 the count C will be set to 33 because 32+1 is less than the maximum C of 63.

In the example shown in FIG. 6, since HS1, LS2 were turned on and HS2, LS1 were turned off in block S603, controller 104 can turn off HS1, LS2 and turn on HS2, LS1 in block S602. At block S604, the clock of controller 104 can transition from a high state to a low state, i.e., falling edge event occurs. In response to the falling edge event, process 600 can proceed to block S606 where controller 104 can start a tristate mode by turning off HS1, HS2, LS1 and LS2. In an aspect, since HS2 and LS1 were turned on in block S602, when controller 104 turns off HS2 and LS1 for tristate mode, the voltage at LS1 may need some time to drop to zero. The insertion of tristate mode in response to the falling edge event can allow sufficient voltage to be fed into comparator 402 of circuit 152 for measuring voltage across LS1, from nodes TX1 and PVSS. Therefore, at block S606, controller 104 inserts the tristate mode close to a zero-voltage event (e.g., before voltage at LS1 becomes zero). Blocks S608, S610, S612 and S614 can be the same as blocks S609, S611, S613 and S615, respectively. By the end of the tristate time at block S614, process 600 can return to block S603.

According to process 600, controller 104 can perform the negative voltage spike detection to update the count C at each transition, including rising edge and falling edge, of the clock of transmitter 110. Therefore, the count C can be updated for every clock cycle of transmitter 110. To be described in FIG. 7 below, the count C can be used for determining whether to increase the capacitance of VC1 and VC2 shown in FIG. 2, or to selectively switch the capacitors shown in FIG. 3, in order to tune antenna 124 of transmitter 110.

Figure 7:
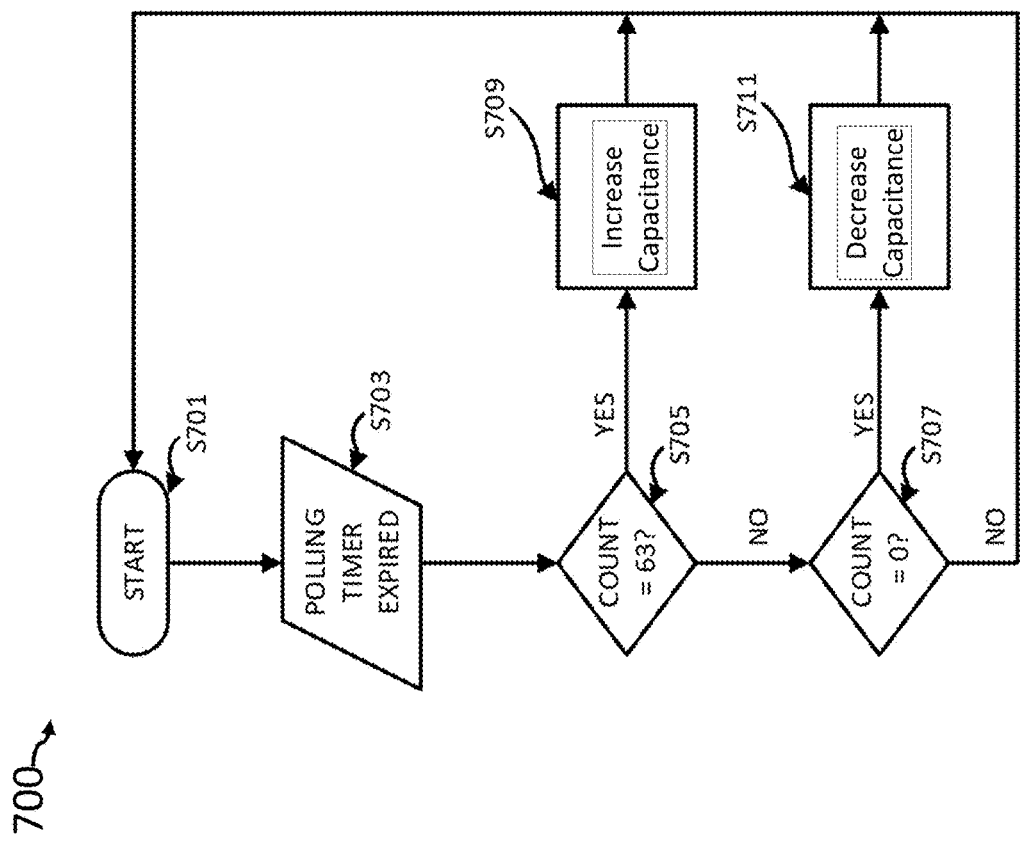
FIG. 7 is a diagram showing a process to determine a capacitance adjustment in run time antenna matching for near field communication wireless power transfer in one embodiment.

FIG. 7 is a diagram showing a process to determine a capacitance adjustment in run time antenna matching for near field communication wireless power transfer in one embodiment. A process 700 shown in FIG. 7 can include one or more operations, actions, or functions as illustrated by one or more of blocks S701, S703, S705, S707, S709 and/or S711. Although illustrated as discrete blocks, various blocks can be divided into additional blocks, combined into fewer blocks, eliminated, performed in different order, or performed in parallel, depending on the desired implementation. Descriptions of FIG. 7 can reference components that are shown in FIG. 1 to FIG. 6.

Process 700 can be performed by controller 104 to determine whether to increase or decrease capacitance of EMC filter, shown in FIG. 2 and FIG. 3, based on an accumulation of the count C. Process 700 can begin at block S701 where controller 104 can start to perform process 700. At block S703, controller 104 can determine whether a polling timer has expired. In one embodiment, the polling timer can be configured to track a number of clock cycles of transmitter 110. By way of example, the polling timer can track the clock cycles of transmitter 110 and assert an expiration for every five clock cycles, or other programmable number of cycles that is less than the maximum value of C.

In response to expiration of the polling timer at block S703, controller 104 can determine if the count C has reached a maximum value of 63 at block S705. If the count C has reached the maximum value of 63, then in block S709, controller 104 can increase the capacitance in EMC filter 202 shown in FIG. 2 or FIG. 3. By way of example, controller 104 can increase the capacitance of EMC filter 202 by increasing capacitance of VC1 and VC2 in FIG. 2, or by switching additional capacitors into the EMC filter 202 shown in FIG. 3. If the count C has not reached the maximum value of 63, process 700 can proceed to block S707 to check if the value of count C reached a minimum of zero.

If the count C has reached zero, then in block S711, controller 104 can decrease the capacitance in EMC filter 202 shown in FIG. 2 or FIG. 3. By way of example, controller 104 can decrease the capacitance of EMC filter 202 by decreasing capacitance of VC1 and VC2 in FIG. 2, or by switching capacitors out of the EMC filter 202 shown in FIG. 3. After increasing the capacitance in block S709 or decreasing the capacitance at block S711, process 700 can return to block S701 to wait for a next expiration of polling timer at block S703.

Figure 8:
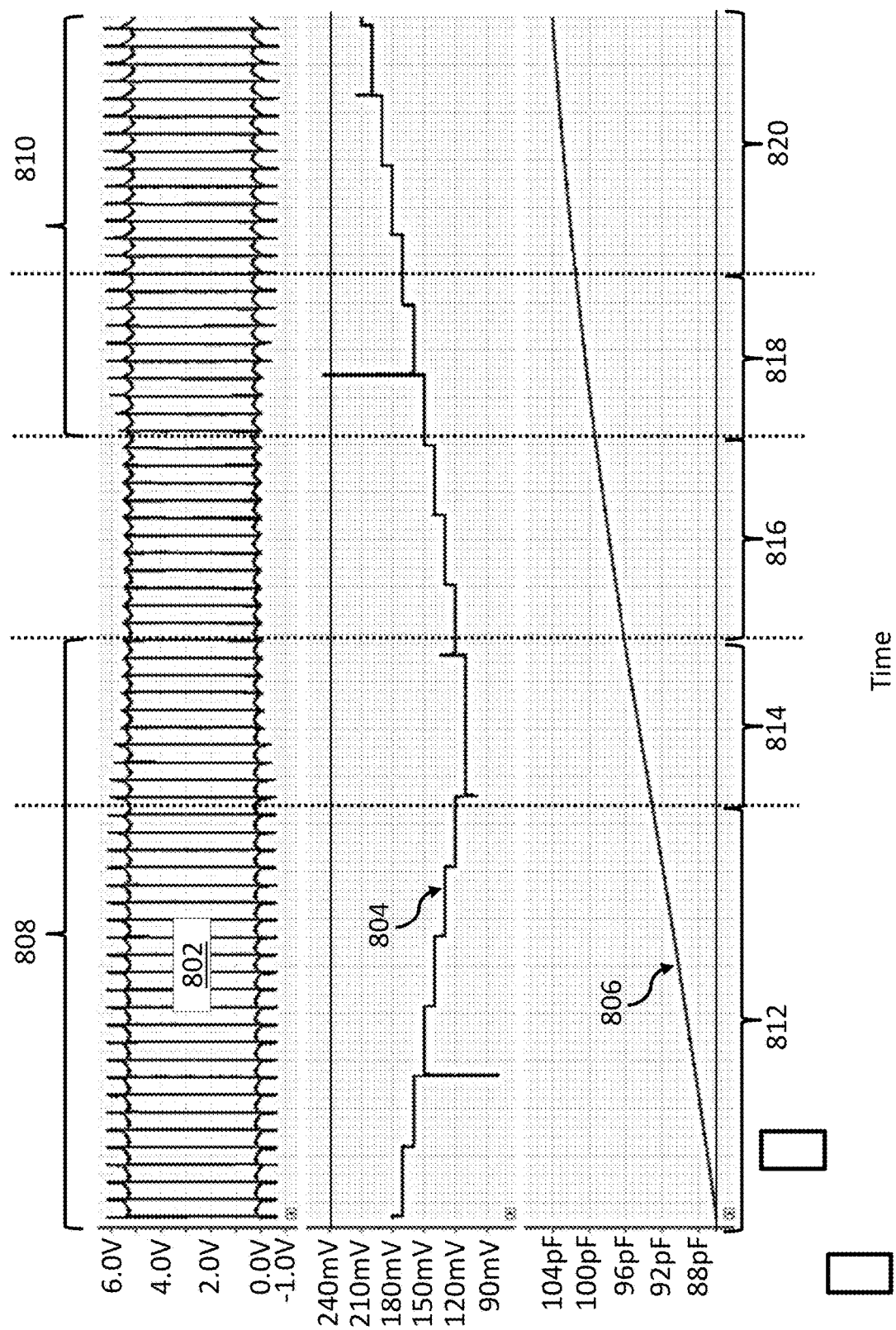
FIG. 8 is a diagram showing waveforms of an example implementation of runtime antenna matching for near field communication wireless power transfer in one embodiment.

FIG. 8 is a diagram showing waveforms of an example implementation of runtime antenna matching for near field communication wireless power transfer in one embodiment. Descriptions of FIG. 8 can reference components that are shown in FIG. 1 to FIG. 7. The waveforms of 802 depict the voltages at nodes TX1 and TX2 of the switching converter 106 for a half-cycle. The waveform 804 depicts the voltage being applied to VC1 and VC2 of antenna interface circuit 102 shown in FIG. 2. The waveform 806 is an illustration of the real value of the variable capacitors, e.g., VC1 and VC2 of antenna interface circuit 102 shown in FIG. 2. In a first time period 812, a resonant frequency Fres can be drastically greater than the switching frequency Fsw as a result of presence of negative voltage spikes in voltages measured from nodes TX1, TX2. According to process 600 in FIG. 6, when Fres is greater than Fsw, the count C can increase. Then according to process 700 in FIG. 7, when the count C reaches its maximum value, controller 104 can increase the capacitance of VC1, VC2. Note that in waveform 804, the voltage being applied to VC1, VC2 resembles a step function due to the controller 104 adjusting the capacitance of VC1, VC2 based on expiration of the polling time in FIG. 7 and based on whether the count C has reached its maximum value. In other words, the adjustment to the voltage being applied to VC1, VC2 may not need to be performed in every cycle to preserve processing power. In a second time period 814, resonant frequency Fres remains greater than the switching frequency Fsw as a result of the presence of negative voltage spikes in voltages measured from nodes TX1, TX2 at the beginning of the switching cycle. Thus, controller 104 can continue to increase the capacitance of VC1, VC2 in time period 814.

In a third time period 816, resonant frequency Fres is equal to the switching frequency Fsw as a result of absence of negative voltage spikes in voltages measured from nodes TX1, TX2 at the beginning of the switching cycle. Thus, the capacitance of VC1, VC2 can be considered as being the optimal capacitance to match the impedance of antenna 124 to the output impedance of transmitter 110. In one embodiment, according to process 600 in FIG. 6, when Fres is equal to Fsw, the count C can decrease. Then according to process 700 in FIG. 7, when the count C reaches its minimum value or zero, controller 104 can decrease the capacitance of VC1, VC2.

In a fourth time period 818, resonant frequency Fres becomes less than the switching frequency Fsw as a result of absence of negative voltage spikes in voltages measured from nodes TX1, TX2 at the beginning of the switching cycle. According to process 600 in FIG. 6, when Fres is less than Fsw, the count C can decrease. Then according to process 700 in FIG. 7, when the count C reaches its minimum value or zero, controller 104 can decrease the capacitance of VC1, VC2. In a fifth time period 820, resonant frequency Fres remains less than the switching frequency Fsw as a result of absence of negative voltage spikes in voltages measured from nodes TX1, TX2 at the beginning of the switching cycle. Thus, controller 104 can continue to decrease the capacitance of VC1, VC2 in time period 820.

Figure 9:
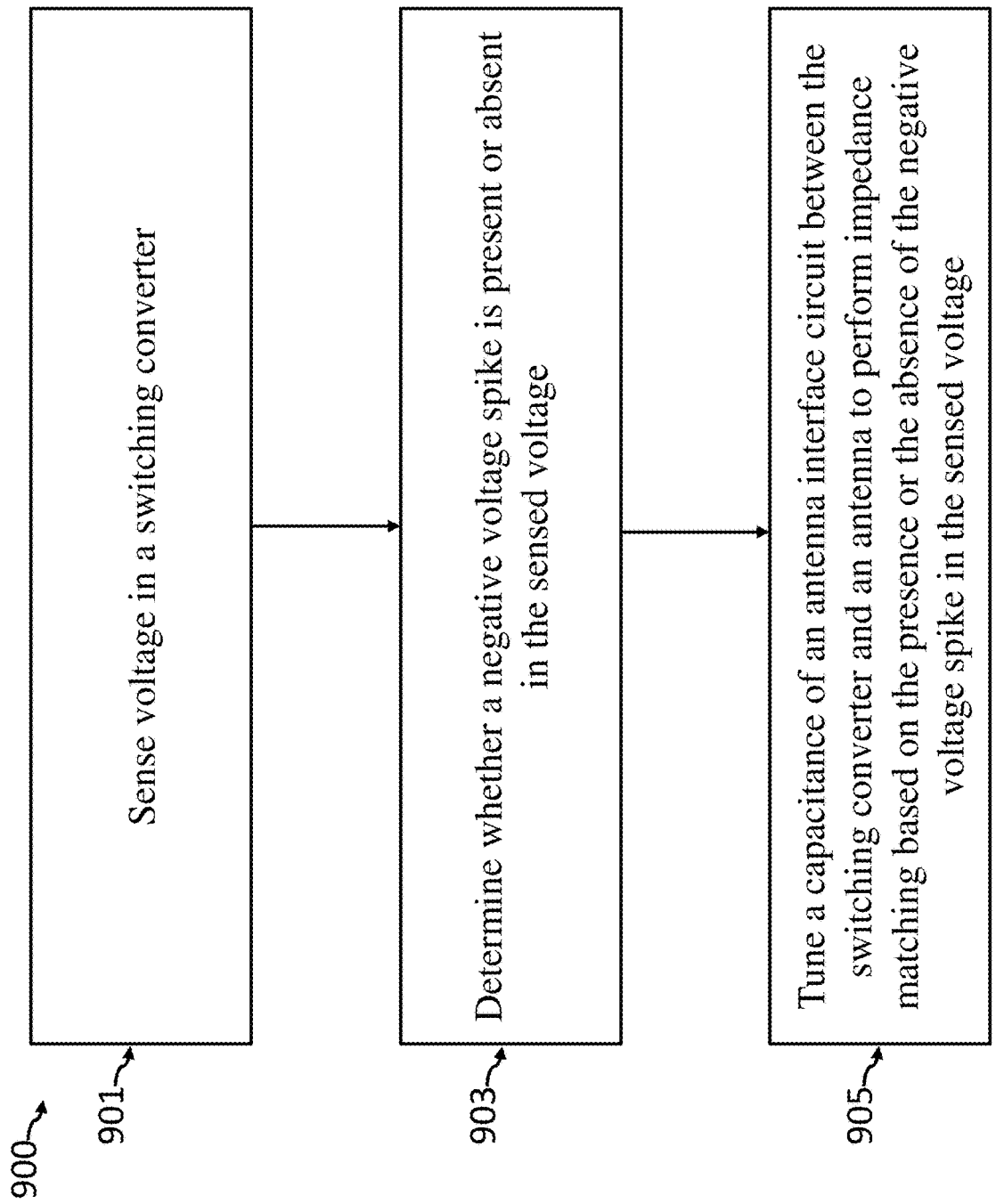
FIG. 9 is a flow diagram illustrating a process to implement runtime antenna matching for near field communication wireless power transfer in one embodiment.

FIG. 9 is a flow diagram illustrating a process to implement runtime antenna matching for near field communication wireless power transfer in one embodiment. The process 900 can include one or more operations, actions, or functions as illustrated by one or more of blocks 901, 903, and/or 905. Although illustrated as discrete blocks, various blocks can be divided into additional blocks, combined into fewer blocks, eliminated, performed in different order, or performed in parallel, depending on the desired implementation.

Process 900 can be implemented by a wireless power transfer device (e.g., transmitter, receiver, or transceiver). Process 900 can begin at block 901, where a circuit in a wireless power transfer device can sense voltage in a switching converter. In one embodiment, the circuit can detect a clock event of a clock signal. The circuit can, in response to detection of the clock event, operate the switching converter in a tristate mode. The circuit can sense the voltage in the switching converter during the tristate mode.

The process 900 can continue from block 901 to block 903. At block 903, the circuit can determine whether a negative voltage spike is present or absent in the sensed voltage. The process 900 can continue from block 903 to block 905. At block 905, the circuit can, based on the presence or the absence of the negative voltage spike in the sensed voltage, tune a capacitance of an antenna interface circuit between the switching converter and an antenna to perform impedance matching. In one embodiment, the circuit can tune the capacitance of the antenna interface circuit by determining the negative voltage spike is present in the sensed voltage. The circuit can, in response to determination that the negative voltage spike is present in the sensed voltage, increase the capacitance of the antenna interface circuit. The circuit can further determine the negative voltage spike is absent in the sensed voltage. The circuit can, in response to determination that the negative voltage spike is absent in the sensed voltage, decrease the capacitance of the antenna interface circuit.

In one embodiment, the circuit can determine that a number of consecutive negative voltage spikes present in the sensed voltage has reached a first predefined value and, in response to determination that the number of consecutive negative voltage spike presence reached the first predefined value, increase the capacitance of the antenna interface circuit. In one embodiment, the circuit can determine that a number of consecutive negative voltage spikes absence in the sensed voltage has reached a second predefined value and, in response to determination that the number of consecutive negative voltage spike absence reached the second predefined value, decrease the capacitance of the antenna interface circuit.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An integrated circuit comprising:
   a controller;
   a switching converter; and
   a circuit configured to:
     sense voltage output from the switching converter while the switching converter is operating in a tristate mode; and
     determine whether a negative voltage spike is present or absent in the sensed voltage,
   wherein the controller is configured to, based on the presence or the absence of the negative voltage spike in the sensed voltage, output a control signal configured to control tuning of a capacitance of an antenna interface circuit between the switching converter and an antenna to perform impedance matching.

2. The integrated circuit of claim 1, wherein the circuit is configured to sense the voltage from a low side switch in the switching converter.

3. The integrated circuit of claim 1, wherein the controller is configured to:
   determine the negative voltage spike is present in the sensed voltage;
   in response to determination that the negative voltage spike is present in the sensed voltage, increase the capacitance of the antenna interface circuit;
   determine the negative voltage spike is absent in the sensed voltage; and
   in response to determination that the negative voltage spike is absent in the sensed voltage, decrease the capacitance of the antenna interface circuit.

4. The integrated circuit of claim 1, wherein the controller is configured to, based on the presence or absence of the negative voltage spike, determine an amount of voltage to be applied to a variable capacitor in an electromagnetic compatibility (EMC) filter in the antenna interface circuit, to tune the capacitance of the antenna interface.

5. The integrated circuit of claim 1, wherein the controller is configured to:
   determine a number of consecutive negative voltage spike presence in the sensed voltage has reached a first predefined value;
   in response to determination that the number of consecutive negative voltage spike presence reached the first predefined value, increase the capacitance of the antenna interface circuit;
   determine a number of consecutive negative voltage spike absence in the sensed voltage has reached a second predefined value; and
   in response to determination that the number of consecutive negative voltage spike absence reached the second predefined value, decrease the capacitance of the antenna interface circuit.

6. The integrated circuit of claim 1, wherein:
   the controller is configured to:
     detect a clock event of a clock signal; and
     in response to detection of the clock event, operate the switching converter in a tristate mode.

7. The integrated circuit of claim 6, wherein:
   the clock event is a rising or falling edge of the clock signal; and
   prior to the next clock event, the switching converter is returned to a normal operation mode.

8. A device comprising:
   an antenna;
   an antenna interface circuit; and
   a transmitter comprising a switching converter, wherein the transmitter is configured to:
     sense voltage output from the switching converter while the switching converter is operating in a tristate mode;
     determine whether a negative voltage spike is present or absent in the sensed voltage; and
     based on the presence or the absence of the negative voltage spike in the sensed voltage, tune a capacitance of the antenna interface circuit between the switching converter and the antenna to perform impedance matching.

9. The device of claim 8, wherein the transmitter is configured to sense the voltage from a low side switch in the switching converter.

10. The device of claim 8, wherein the transmitter is configured to:
    determine the negative voltage spike is present in the sensed voltage;
    in response to determination that the negative voltage spike is present in the sensed voltage, increase the capacitance of the antenna interface circuit;
    determine the negative voltage spike is absent in the sensed voltage; and
    in response to determination that the negative voltage spike is absent in the sensed voltage, decrease the capacitance of the antenna interface circuit.

11. The device of claim 8, wherein the transmitter is configured to, based on the presence or absence of the negative voltage spike, determine an amount of voltage to be applied to a variable capacitor in an electromagnetic compatibility (EMC) filter in the antenna interface circuit, to tune the capacitance of the antenna interface circuit.

12. The device of claim 8, wherein the transmitter is configured to:
    determine a number of consecutive negative voltage spike presence in the sensed voltage has reached a first predefined value;

in response to determination that the number of consecutive negative voltage spike presence reached the first predefined value, increase the capacitance of the antenna interface circuit;

determine a number of consecutive negative voltage spike absence in the sensed voltage has reached a second predefined value; and in response to determination that the number of consecutive negative voltage spike absence reached the second predefined value, decrease the capacitance of the antenna interface circuit.

13. The device of claim 8, wherein:
the transmitter is configured to:
  detect a clock event of a clock signal; and
  in response to detection of the clock event, operate the switching converter in the tristate mode.

14. The device of claim 13, wherein:
the clock event is a rising or falling edge of the clock signal; and
prior to the next clock event, the switching converter is returned to a normal operation mode.

15. A method for operating a wireless power device, the method comprising:
sensing voltage output from a switching converter operating in a tristate mode;
determining whether a negative voltage spike is present or absent in the sensed voltage; and
based on the presence or the absence of the negative voltage spike in the sensed voltage, tuning a capacitance of an antenna interface circuit between the switching converter and an antenna to perform impedance matching.

16. The method of claim 15, wherein tuning the capacitance of the antenna interface circuit comprises:
determining the negative voltage spike is present in the sensed voltage;
in response to determination that the negative voltage spike is present in the sensed voltage, increasing the capacitance of the antenna interface circuit;
determining the negative voltage spike is absent in the sensed voltage; and
in response to determination that the negative voltage spike is absent in the sensed voltage, decreasing the capacitance of the antenna interface circuit.

17. The method of claim 15 further comprises:
determining that a number of consecutive negative voltage spikes presence in the sensed voltage has reached a first predefined value;
in response to determination that the number of consecutive negative voltage spike presence reached the first predefined value, increasing the capacitance of the antenna interface circuit;
determining that a number of consecutive negative voltage spike absence in the sensed voltage has reached a second predefined value; and
in response to determination that the number of consecutive negative voltage spike absence reached the second predefined value, decreasing the capacitance of the antenna interface circuit.

18. The method of claim 15 further comprises:
detecting a clock event of a clock signal; and
in response to detection of the clock event, operating the switching converter in a tristate mode.

* * * * *